3,822,115
METHOD AND REAGENT FOR URIC ACID
DETERMINATION
Leo G. Morin and Jerome R. Prox, Miami, Fla., assignors to Medico Electronic, Inc., Indianapolis, Ind.
No Drawing. Filed Aug. 30, 1972, Ser. No. 284,882
Int. Cl. G01n 33/16
U.S. Cl. 23—230 B    5 Claims

ABSTRACT OF THE DISCLOSURE

A method and reagent for the determination of uric acid in biological fluids by the reduction of ferric phenanthroline without the requirement for protein precipitation.

BACKGROUND OF THE INVENTION

(1) Field of this Invention

This invention relates to a colorimetric method for the determination of uric acid.

(2) Prior Art

Uric acid determinations are of considerable clinical significance, since uric acid elevation may occur in gout, renal failure, toxemia, leukemia, pneumonia, and polycythemia.

Uric acid has heretofore been determined by two principal methods: the reduction of alkaline phosphotungstate to tungsten blue and the decreased absorbance of the sample at 290 to 293 nm. after treatment with the enzyme uricase. The alkaline phosphotungstate method is not very specific, as several other substances reduce the phosphotungstate, including glutathione, ascorbic acid, glucose, all the reducing amino acids, and common drugs as caffeine and salicylates. The phosphotungstate method usually requires deproteinization, which, in addition to being intrinsically undesirable, reduces the sensitivity of the method due to co-precipitation of uric acid onto protein resulting in considerable loss of uric acid.

The uricase method is the method of choice for research purposes but it is unsuitable for routine clinical work because it requires meticulous attention to details for accurate results and also requires an ultraviolet spectrophotometer, an item not generally available in clinical laboratories. There is a need for a method for uric acid determination that is colorimetric in the visible range, that is specific for uric acid, and which does not require deproteinization.

BROAD DESCRIPTION OF THIS INVENTION

It is the primary objective of this invention to provide a colorimetric method for the determination of uric acid.

Another object is to provide a direct method for uric acid determination without the need to remove proteins.

Still another object is to provide a method that is specific for uric acid.

A further object is to provide a method that is sensitive and requires only a small sample.

Another object is to provide a method that is rapid, yielding results within five minutes.

Another object is to provide a method that does not require any heating above ambient temperature.

This invention includes a reagent for determining uric acid in biological fluids or other compatible materials, comprised of an aqueous solution containing ferric ions, a ferrous indicator and a buffer, the pH being between 3 to pH 6.5.

It has been found that in a slightly acidic solution, broadly speaking in a solution of pH 3 to pH 6.5, uric acid will reduce the ferric ion to the ferrous state. It has further been determined that in this pH range and at ambient temperature, other reducing materials commonly found in biological fluids do not reduce the ferric ion. The reduction is, therefore, specific for uric acid. It has been further found that certain types of compounds are useful for determining the reduction of ferric ion to ferrous ion. The preferred ferrous indicator is 1,10-phenanthroline hydrochloride. It has been further determined that the reaction may take place in any suitable acidic buffer system, as, for example, maleic acid, acetic acid, succinic acid and other acids, which have a suitable pK for buffering in the pH range of 3 to 6.5, preferably at 5.5.

This invention includes the process of determining the concentration of the uric acid. The method of this invention can be practised by mixing a small sample of biological fluid in a ratio 1/100 to 1/25 with a reagent containing water, 0.01 to 1 gram percent if ferric chloride or other soluble ferric salt, 0.01 to 1 gram percent of 1,10-phenanthroline or other suitable ferrous indicator, and a maleic acid buffer or other suitable acidic buffer. The reagent has a pH in the range of 3 to 6.5, preferably at pH 5.5. The absorbance is read between 450 and 700 nm. using a colorimeter and converted to uric acid concentration.

The method of this invention does not require the removal of protein; requires only a small sample, is rapid, yielding results within five minutes and no heating above ambient temperature is needed.

The biological fluids tested can be those of man or animal. Examples of biological fluids are serum, plasma, urine and spinal fluid.

DETAILED DESCRIPTION OF THIS INVENTION

Examples of useful ferrous indicators are: the 2,2'-bipyridines, such as 2,2'-bipyridine, 4,4'-dioctyl-2,2'-bipyridine, 4,4'-dinitro-2,2'-bipyridine, 4,4'-diphenyl-2,2'-bipyridine, 4,4'-dihydroxy-2,2'-bipyridine, and 4,4'-dimethyl-2,2'-bipyridine; the 1,10-phenanthrolines, such as 4,7-dihydroxy-1,10-phenanthroline, 4,7-dimethyl-1,10-phenanthroline, 5,6-dimethyl-1,10-phenanthroline, 4,7-diphenyl-1,10-phenanthroline disulfonic acid, 5-methyl-1,10-phenanthroline, 5-nitro-1,10-phenanthroline, 4,7-dipropyl-2,2'-bipyridine and 1,10-phenanthroline; the triazines such as 3-(4-phenyl-2-pyridyl)-5,6-diphenyl-1,2,4-triazine, 3-(2-pyridyl)-5,6-diphenyl-1,2,4-triazine and 2,4,6-tripyridyl-1,3,5-triazine, the terpyridines, such as 4'-phenyl-2,2',2'-terpyridine, and 4,4',4''-triphenyl-2,2',2''-terpyridine; and other pyridyl compounds, such as phenyl-2-pyridyl ketoxime, and 2,3,5,6-tetrakis(2'-pyridyl)-pyrazine. More broadly, substituted and unsubstituted mono- di- and polypyridyl compounds have been found to be good ferrous indicators.

The preferred water-soluble ferric salt is ferric chloride. Examples of suitable water-soluble ferric salts are ferric boride, ferric dichromate, ferric bromide, ferric formate, ferric citrate, ferric fluoride, ferric silicate, ferric lactate, ferric oxalate, ferric maleate, ferric nitrate and ferric sulfate.

Examples of useful acidic buffers are maleic acid (preferred), acetic acid and succinic acid.

Any suitable colorimeter or spectrophotometer can be used to measure the absorbance. Examples of useful colorimeters are: Coleman, Model 44; Perkin-Elmer, Model 124; the colorimeter disclosed in U.S. Ser. No. 224,457, applicants: Raymond W. Kiess and Peter H. Stewart, filed: Feb. 8, 1972, assignee: Kiess Instruments, Inc., 8768 SW. 131st St., Miami, Fla., 33156; and the direct reading colorimeter disclosed in U.S. Pat. No. 3,561,878, inventor: R. W. Kiess.

The term acid buffer, as used herein, means that a salt thereof is included. An example is maleic acid buffer which includes maleic acid and a salt or ester thereof, e.g., sodium maleate, potassium maleate, barium maleate and lithium maleate.

The following examples illustrate the invention but they do not limit it.

EXAMPLE 1

For convenience the reagent is prepared into three components. Component A consists of 0.258 gm. of 1,10-phenanthroline hydrochloride in 100 ml. of water. Component B consists of a 0.1 M maleic acid buffer adjusted to pH 5.5 with sodium hydroxide. Component C consists of 1.05 grams of ferric chloride in 100 ml. of water. To a series of tubes is added 0.5 ml. of component A, 2.5 ml. of component B, and 0.1 ml. of component C. A set of standards are prepared and made to contain 2, 4, 6, 8, 10, 12, 14, 16, 18 and 20 mg. percent of a specified level of the uric acid standards. The tubes are allowed to sit a room temperature. Within 5 minutes a stable red color develops and the absorbance is determined at 490 nm. using a colorimeter (Coleman Model 44). There is a linear proportion between the uric acid level and the absorbance.

EXAMPLE 2

The reagent is prepared and tubed as in Example 4 set of standards is prepared as in Example 1, except that they are prepared in pooled human serum. The test procedure of Example 1 is followed. Again, a stable red color develops within 5 minutes. The absorbance is in linear proportion to the uric acid concentration.

EXAMPLE 3

The reagent and standards are prepared and tubed as in Example 2. High physiological levels of glutathione (50 mg. percent), ascorbic acid (5 mg. percent), glucose (200 mg. percent), creatinine (10 mg. percent), acetylsalicylic acid (10 mg. percent) are added to the standards. The test is conducted as in Example 2. No interference or elevation occurs.

EXAMPLE 4

The reagent and standards are prepared and tubed as in Example 1, except that 1,10-phenanthroline hydrochloride is replaced by 4,7-diphenyl-1,10-phenanthroline disulfonic acid. The test is conducted as in Example 1. Within 5 minutes a stable red color develops and the absorbance is determined at 540 mm. There is a linear proportion between the uric acid level and the absorbance.

EXAMPLE 5

The reagent is prepared and tubed as in Example 4. The standards are prepared as in Example 3 and the test is conducted as in Example 3. The results are the same as in Example 4.

What is claimed is:

1. A reagent for determination of uric acid in biological fluids and other compatible materials by direct acid reduction of ferric ions which comprises an aqueous solution containing ferric ions, 1,10-phenanthroline, which is a ferrous indicator, and a buffer, which is selected from the group consisting of a maleic acid buffer, an acetic acid buffer and a succinic acid buffer, the pH of the solution being between 3 and 6.5.

2. A reagent according to claim 1 wherein the ferric ion is added as a ferric salt in the range of 0.01 to 1 gram percent.

3. A reagent according to claim 1 wherein the ferrous indicator is present at a level of 0.01 to 1 gram percent.

4. A method for determining uric acid in biological fluid which comprises admixing a sample of biological fluid with the reagent of claim 1, and determining the concentration of uric acid by means of measuring the absorbance.

5. A method according to claim 4 wherein the sample and the reagent are mixed in a ratio of 1/100 to 1/25, wherein the ferric ion is added as a ferric salt in the range of 0.01 to 1 gram percent, and wherein the ferrous indicator is present at a level of 0.01 to 1 gram percent.

References Cited
UNITED STATES PATENTS

| 3,711,252 | 1/1973 | Roy | 23—230 B |
| 3,733,177 | 5/1973 | Klein | 23—230 B |

RONALD E. SERWIN, Primary Examiner

U.S. Cl. X.R.

252—408